United States Patent [19]
Yamashita et al.

[11] Patent Number: 4,673,243
[45] Date of Patent: Jun. 16, 1987

[54] BRANCH STRUCTURES FOR ROD-TYPE OPTICAL TRANSMISSION LINES

[75] Inventors: Hiroshi Yamashita, Ikeda; Kanenaga Fujii, Kawanishi; Junji Hayakawa, Takatsuki; Toru Komiyama, Kawanishi; Sinji Tamaru, Suita, all of Japan

[73] Assignees: Director-General of Agency of Industrial Science & Technology; Diakin Kogyo Co., Ltd., both of Japan

[21] Appl. No.: 705,790

[22] Filed: Feb. 26, 1985

[30] Foreign Application Priority Data

Apr. 10, 1984 [JP] Japan .................. 59-72178
Apr. 10, 1984 [JP] Japan .................. 59-72179

[51] Int. Cl.⁴ .................. G02B 6/26; G02B 6/42
[52] U.S. Cl. .................. 350/96.15
[58] Field of Search ............ 350/96.15, 96.16, 96.20, 350/96.21

[56] References Cited

U.S. PATENT DOCUMENTS

| | | | |
|---|---|---|---|
| 4,360,248 | 11/1982 | Bickel et al. | 350/96.15 |
| 4,400,055 | 8/1983 | Ozeki et al. | 350/96.15 |
| 4,431,261 | 2/1984 | Kozikowski | 350/96.15 |
| 4,432,599 | 2/1984 | McMahon | 350/96.15 |
| 4,465,335 | 8/1984 | Eppes | 350/96.15 |
| 4,601,541 | 7/1986 | Shaw et al. | 350/96.15 |

*Primary Examiner*—Robert E. Wise
*Attorney, Agent, or Firm*—Larson and Taylor

[57] ABSTRACT

This invention provides a branch structure for a rod-type optical transmission line having a quartz rod core, characterized in that two quartz rod branch members bent to a substantially L-shaped form and having a circular cross section are combined together with the axes of longitudinal portions of the members in parallel and with the horizontal portions thereof bifurcated, the combined longitudinal portions being ground to a planar surface each at the opposed faces thereof so as to conjointly form a circular cross section in a predetermined cross sectional area ratio, the combined longitudinal portions being adhered together at the ground planar surfaces, conjointly having the same diameter as the quartz rod core and being coaxially connected to the core at a straight portion of the transmission line. The branch structure of the present invention can divide light for transmission into a branch line at a desired ratio with a reduced transmission loss.

10 Claims, 10 Drawing Figures

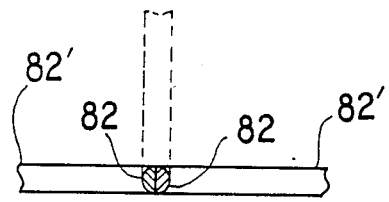
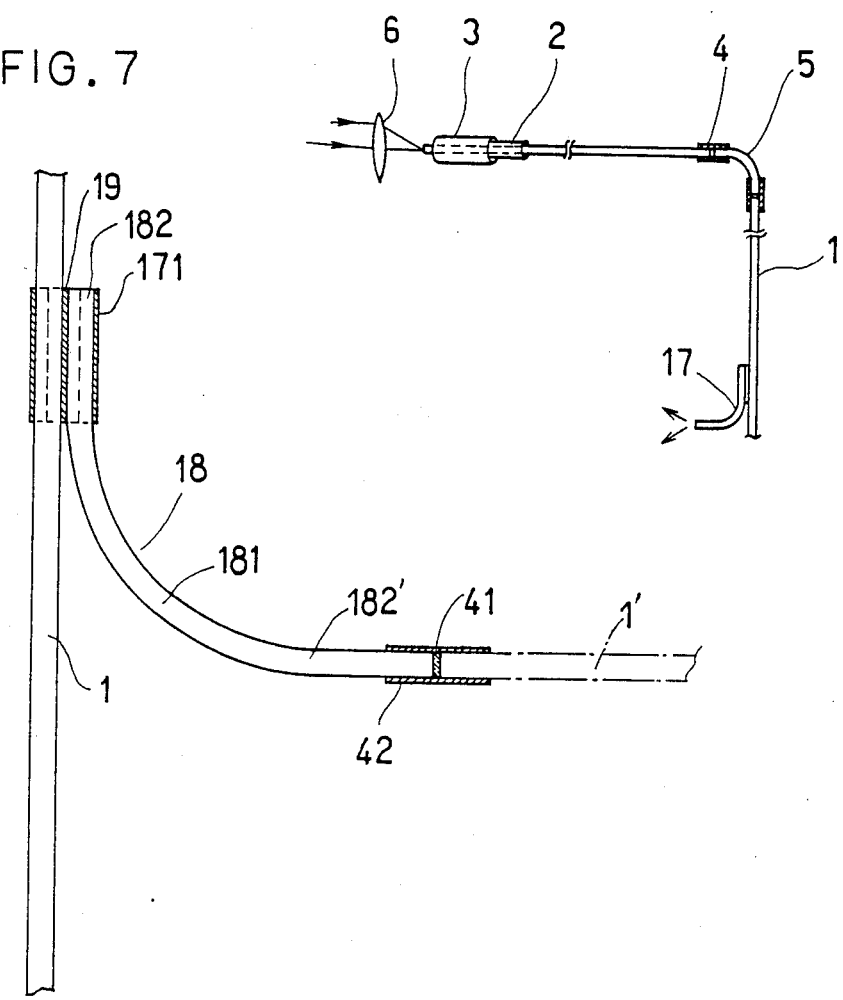

BRANCH STRUCTURES FOR ROD-TYPE OPTICAL TRANSMISSION LINES

The present invention relates to branch structures for rod-type optical transmission lines.

We have already proposed and developed a rod-type optical transmission line comprising a quartz rod (10 to 30 mm in diameter) serving as a transmission core (see, for example, Japanese Unexamined Patent Publication No. 166901/1984). This rod-type optical transmission line has the feature of being much lower in transmission loss and capable of transmitting light more efficiently than the conventional optical transmission lines in the form of a bundle of fibers. For example, it is suitable for transmitting sunlight as illuminating light to a location, such as the basement of a building, which is not accessible to sunlight.

When the sunlight is to be used for illumination, there arises the need to send the sunlight dividedly to a plurality of locations through branch lines extending from a main transmission line.

In the case of the known fiber bundle-type optical transmission line, the fibers function independently as transmission lines and have flexibility, so that the bundle of fibers can be divided into a plurality of smaller bundles at branch junctions to readily provide branch lines.

In the case of the rod-type optical transmission line, however, the transmission core comprises a single quartz rod which, when deformed in its circular cross section, will not function satisfactorily or fails to function as an optical transmission member. Accordingly it has been substantially impossible to form branch junctions by dividing the quartz rod into smaller portions, and it has been thought difficult to provide branch junctions for the line of this type.

An object of the present invention is to provide a branch structure by which branch junctions can be formed easily in rod-type optical lines.

Another object of the invention is to provide a branch structure by which light can be divided and guided into branch lines with a reduced transmission loss.

Still another object of the invention is to provide a branch structure for dividing light for transmission into a branch line at a ratio which is determined as desired.

According to the present invention, there is provided a branch structure for a rod-type optical transmission line having a quartz rod core, characterized in that two quartz rod branch members bent to a substantially L-shaped form and having a circular cross section are combined together with the axes of longitudinal portions of the members in parallel and with the horizontal portions thereof bifurcated, the combined longitudinal portions being ground to a planar surface each at the opposed faces thereof so as to conjointly form a circular cross section in a predetermined cross sectional area ratio, the combined longitudinal portions being adhered together at the ground planar surfaces, conjointly having the same diameter as the quartz rod core and being coaxially connected to the core at a straight portion of the transmission line.

According to the invention, there is also provided a branch structure for a rod-type optical transmission line having a quartz rod core, characterized in that a substantially L-shaped quartz rod branch member is connected at the longitudinal portion thereof to a peripheral side portion of the quartz rod core of the transmission line at a straight portion thereof by a transparent elastic joint member, the longitudinal portion of the branch member extending from the rod core with their axes in parallel and with the axis of the horizontal portion of the branch member traverse to the axis of the rod core, the joint member being formed in its opposite side portions with attaching grooves having a circular arc cross section and fittable to the peripheral side portions of the quartz rod core and the quartz rod branch member.

With the branch structure according to the first type of the invention, the light transmitted through a quartz rod forming the transmission core of a main rod-type optical transmission line is led through combined longitudinal portions of a pair of quartz rod branch members connected coaxially to the quartz rod core and then transmitted to horizontal portions extending from the combined longitudinal portions, whereby the light is divided. The divided quantities of light are determined by the cross sectional area ratio of the combined longitudinal portions. For example, when the combined longitudinal portions are 5:5 in the cross sectional area ratio, the light is divided into equal quantities. Further when the ratio is 7:3, the light is divided in the ratio of 0.7:0.3. The light can be divided in a desired ratio by suitably determining the cross sectional area ratio. Although two quartz rod branch members are combined together to form the branch junction, the junction is substantially circular in any cross section, and the transmission loss at the branch junction is very low and can be as low as up to 1% of the divided quantity of light. Furthermore, the branch junction, which comprises the combination of two quartz rod branch members, is simple in construction and can be fabricated with ease.

With the branch structure according to the second type of the invention, a portion of the light transmitted through a quartz rod serving as the transmission core of a rod-type optical transmission line is dividedly led from a peripheral side portion of the rod core, through a transparent elastic joint member in contact with the side portion, into a quartz rod branch member in contact with the joint member. The quantity of light thus divided or separated off is in proportion to the size of the area of contact between the inner surfaces of the joint member defining the circular arc attaching grooves in opposite side portions thereof and the peripheral side portions of the rod core and the branch member in contact with groove defining surfaces. Accordingly a desired divided quantity of light can be obtained by suitably determining the size of the contact area. At the branch junction, the rod core, the joint member and the branch member are in contact with one another at circular arc surfaces, and the transmission loss at the contact surfaces is very low. In the case of the structure of second type wherein the joint member is used, slight transmission losses occur at the lower end face of the joint member, but even if including these losses, the overall transmission loss can be as low as up to 5% of the divided quantity of light. The branch junction, which comprises the quartz rod branch member and transparent elastic joint member, is very simple in construction and can be fabricated with ease. The radius of curvature of at least one of the circular arc attaching grooves in opposite sides of the joint member may be made slightly larger or smaller than the radius of curvature of the peripheral side portion of the rod core or the branch member which is contacted with the groove. It is then possible to vary the area of contact, and accordingly the divided amount of light, by controlling the pressure of the rod material on the grooved portion. Consequently the brightness of an illuminating device connected to the branch line can be suitably adjusted, hence convenient. The branch member is removably attached to the rod core, so that when the branch member is attached, the illuminating device on the branch line is turned on, while when the branch member is removed, the device goes off. Thus, the branch junction can be made to have a function similar to the function of a switch on electric wiring.

Embodiments of the present invention will be described below with reference to the accompanying drawings, in which:

FIG. 5 is a view in section taken along the line V—V in FIG. 4;

FIG. 6 is an overall view schematically showing an embodiment of branch structure for a rod-type optical transmission line according to the second type of the invention;

FIG. 7 is an enlarged view showing the branch junction of the embodiment of FIG. 6;

Figure 1:
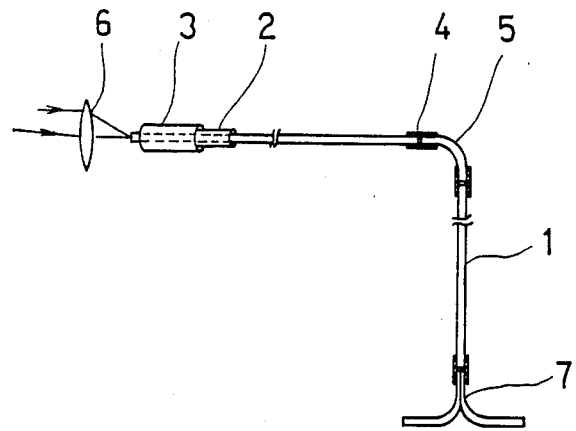
FIG. 1 is an overall view schematically showing an embodiment of branch structure for a rod-type optical transmission line according to the first type of the invention.

FIG. 1 is a schematic diagram showing a rod-type optical transmission line according to the first type of the present invention. The transmission line comprises a quartz rod core 1 disposed in its center, loosely covered with a fluorocarbon resin tube 2 and further sheathed with a metal tube 3 in its entirety for mechanical protection. The fluorocarbon resin tube 2 can be prepared, for example, by shaping a polymer such as tetrafluoroethylene-hexafluoropropylene copolymer, ethylene-tetrafluoroethylene copolymer, polyvinylidene fluoride polymer, vinylidene fluoride-tetrafluoroethylene copolymer and the like by melt extrusion to give a transparent resin tube. To accommodate the difference in thermal expansion between the line and the building or like structure in which it is to be installed, the line is provided with a connecting portion 4 having suitable flexibility and stretchability at intervals of 0.5 to 10 m, preferably 1 to 4 m. Indicated at 5 is a corner portion and at 6 is a condenser lens provided at the incidence end of the line. An example of useful quartz rod is a transparent synthetic quartz rod prepared from silicon tetrachloride or silicon tetrahydride and having an absorption coefficient of $1.0 \times 10^{-5}$ cm$^{-1}$ ($\lambda = 632.8$ nm, refractive index $= 1.46$) The fluorocarbon resin tube 2 can be prepared, for example, from tetrafluoroethylene-hexafluoropropylene copolymer (FEP).

To dividedly direct the light transmitted through the rod-type optical transmission line in two directions, there is provided a branch junction 7.

Two quartz rod branch members 8, 8, bent to a substantially L-shaped form, are used for forming the branch junction 7.

The branch member 8 comprises a middle bent portion 81, a longitudinal portion 82 and a horizontal portion 82' extending from opposite ends of the bent portion 81. The L-shaped branch member 8 can be readily obtained by bending a quartz rod with heating. The rod for forming the branch member 8 is identical with the quartz rod core 1 in material and diameter. Usually a synthetic quartz rod having a diameter of 10 to 30 mm is used for this purpose. The longitudinal portion 82 meets the horizontal portion 82' at an angle of 90 degrees or in the vicinity of 90 degrees.

Although the radius of curvature of the bent portion 81 of the L-shaped branch member 8 can be determined from a wide range, too small a radius of curvature will result in a transmission loss, whereas an excessively large radius of curvature is likely to involve inconvenience in the installation of the line. To avoid these problems and also in view of ease of bending, it is suitable that the radius of curvature be 3 to 15 times, preferably about 10 times, the diameter of the quartz rod. The length of the longitudinal portions 82 and horizontal portion 82', although not limited particularly, is usually about 5 to about 10 cm in view of workability and handleability.

Figure 2:
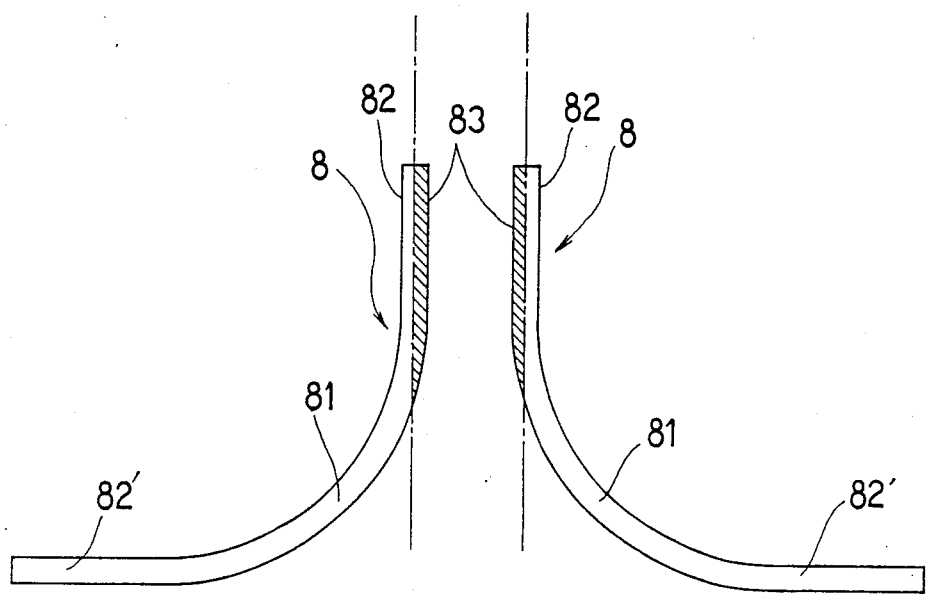
FIG. 2 and FIG. 3 are side elevations showing quartz rod branch members included in the embodiment of FIG. 1 and ground to a planar surface.
Figure 3:
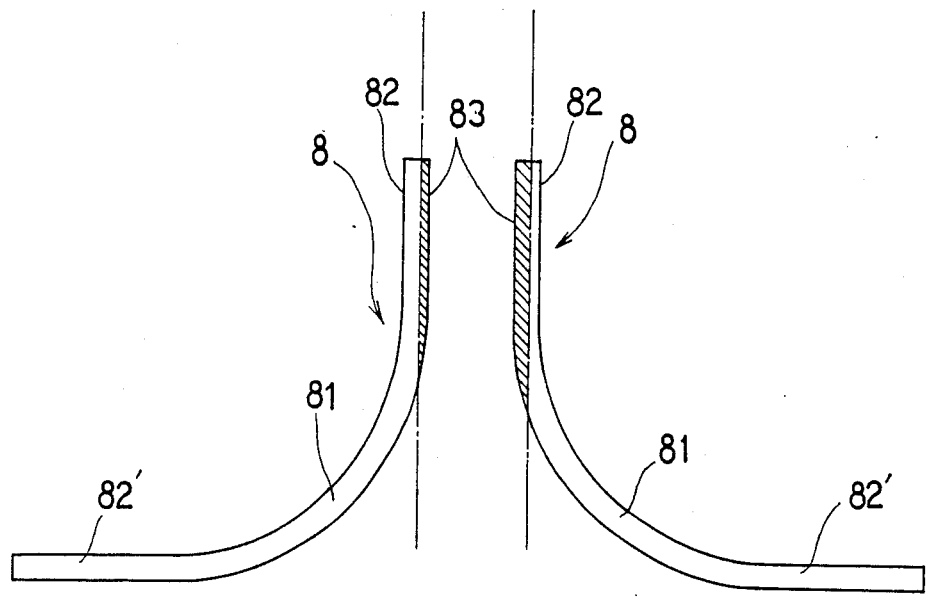

To join the branch members 8, 8 together in an inverted T-form, the longitudinal portions 82, 82 at one side are combined together back-to-back with the horizontal portions 82', 82' bifurcated at an angle of 180 degrees. The longitudinal portions 82, 82 to be combined are each ground to a planar surface at the back so as to conjointly form a circular cross section in a predetermined cross sectional area ratio, and the ground planar surfaces 83, 83 are adhered together. FIGS. 2 and 3 show longitudinal portions thus ground. The cross sectional area ratio is 5:5 in the case of FIG. 2, while the ratio is 7:3 in the case of FIG. 3. In view of ease of grinding and bond strength, the ratio is suitably about 5:5 to about 7:3. The longitudinal portions 82, 82 are not necessarily combined together back-to-back. For example, the longitudinal portions 82, 82 can be combined such that in FIG. 2, one of the longitudinal portions is made stationary and the other longitudinal portion 82 is turned at a desired angle around the axis thereof, e.g., 90 degrees. In this embodiment, the horizontal portion 82' extending from the longitudinal portion 82 thus turned is laid in the position shown by a break line in FIG. 5 and the horizontal portions 82', 82' diverge at an angle of 90 degrees. The horizontal portions 82', 82' diverge at an angle optionally in the range of 0 to 180 degrees.

The adhesive for bonding the ground planar surfaces 83, 83 must be highly transparent and resistant to light. For example, silicone rubber adhesives are most suitable because these adhesives have an absorption coefficient of $3 \times 10^{-3}$ to $5 \times 10^{-3}$ cm$^{-1}$ and a refractive index of 1.4 to 1.5, are close to quartz in refractive index and are also satisfactory in mechanical properties and resistance to visible rays and ultraviolet rays. Also usable are fluoroelastomer adhesives. Examples of useful fluoroelastomers are vinylidene fluoride-hexafluoropropylene copolymer, vinylidene fluoride-hexafluoropropylene tetrafluoroethylene copolymer, etc. The use of adhesive having a refractive index exceedingly larger or smaller than quartz results in a transmission loss, and hence is undesirable. It is preferred, therefore, to use an adhesive with an index of refraction as close as possible to that of quartz.

Figure 4:
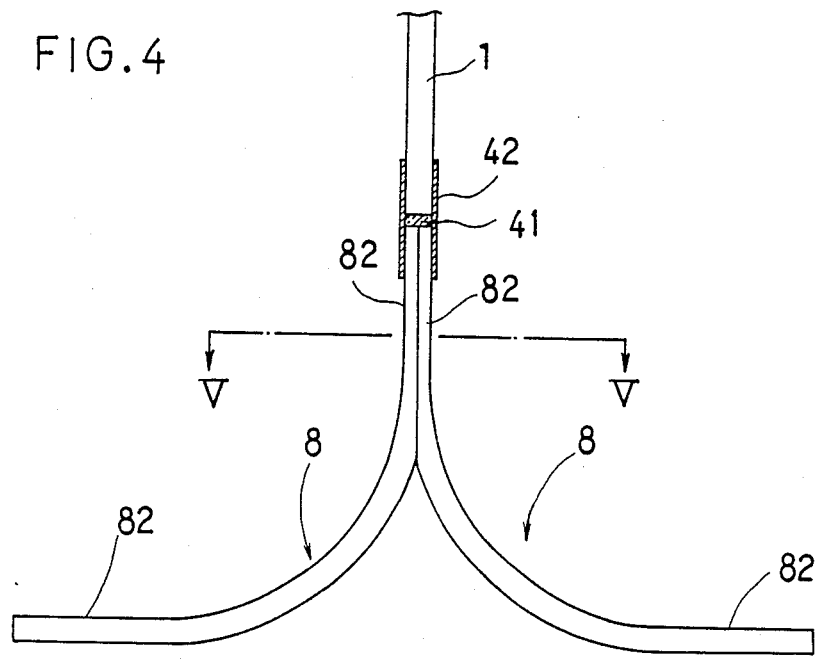
FIG. 4 is an enlarged view showing the branch junction of the embodiment of FIG. 1.

The branch members 8, 8 adhered together are connected, at the combined longitudinal portions 82, 82 of circular cross section, coaxially to the quartz rod core 1 in the rod-type optical transmission line. The combined longitudinal portions 82, 82 conjointly have the same diameter as the rod core 1. FIG. 4 shows the branch structure thus obtained according to the invention. The joint can be coaxially connected to the core 1 by a silicone rubber layer 41 filled between the opposed ends to be connected together and a tube 42 fitted around these ends and covering the rubber layer 41 as seen in FIG. 4. Preferably, the tube is made of FEP (fluorinated ethylene propylene copolymer). Fluoroelastomer may be used in place of FEP.

At the branch structure of the present invention described above, the light transmitted through the quartz rod core 1 is dividedly guided to the horizontal portions 82', 82' through the combined longitudinal portions 82, 82 connected to the core 1. The divided quantities of light are determined by the cross sectional area ratio of the combined longitudinal portions 82, 82. For example, when the cross sectional area ratio is 5:5 as seen in FIG. 2, the light is divided into equal quantities, while when the area ratio is 7:3 as shown in FIG. 3, the light is divided in the ratio of 0.7:0.3. In these cases, little or no division loss was observed. The divided portions of light are further transmitted through the quartz rod cores (not shown) of branch transmission lines coaxially connected to the horizontal portions 82', 82', respectively. Like the optical transmission line, the inverted T-shaped quartz rods forming the branch junction can be protected with FEP material and a metal tube (divided in two).

The FEP tube (or tape) is as low as 1.34 in refractive index, outstanding in mechanical strength and resistance to light and therefore best suited for covering quartz rods.

FIG. 6 is an overall view schematically showing a rod-type optical transmission line according to the second type of the present invention. The transmission line has substantially the same construction as the one shown in FIG. 1 with the exception of a branch junction 17. Throughout FIG. 1 and FIG. 6, like parts are referred to by like reference numerals.

According to the second type of the invention, the branch junction 17, shown in greater detail in FIG. 7, is provided at an intermediate portion of a rod-type optical transmission line for dividedly guiding toward a branch line a portion of the light transmitted through the line.

A quartz rod branch member 18 is used for forming the branch junction 17. The branch member 18 comprises a bent portion 181 and longitudinal portion 182 and horizontal portion 182' extending from opposite ends of the bent portion 181. The branch member 18 is identical with the branch member 8 of the first type in respect of its material, the radius of curvature of the bent portion 181 and the length of the longitudinal portion 182 and horizontal portion 182'. Although the branch member 18 generally used has the same diameter as the rod core 1, a branch member of somewhat smaller diameter may be used when a small quantity of light is to be passed to the branch line.

The branch member 18 is combined, at one longitudinal portion 182 thereof, with a peripheral side portion of the quartz rod core 1 of the transmission line at a straight portion thereof, with their axes in parallel. A transparent elastic joint member 19 is provided between the combined two rods.

For example, silicone rubber, fluoroelastomer, etc. are usable as transparent elastic materials for preparing the joint member 19. Silicone rubber is most suitable because it is close to quartz rods in refractive index and is also satisfactory in mechanical properties and resistance to visible rays and ultraviolet rays as already stated.

Figure 8:
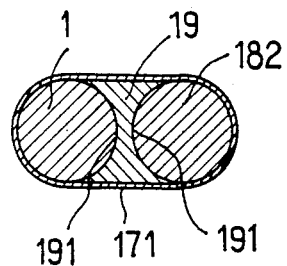
FIG. 8 is a sectional view showing an exemplary cross sectional form of joint member.

As seen in FIG. 8, the joint member 19 is formed, in its opposite side surfaces, with attaching grooves 191, 191 for the peripheral side portions of the rod core 1 and the branch member longitudinal portion 182 to fit in.

The attaching grooves 191 of the joint member 19 are defined by circular arc recessed surfaces, which are in contact with the peripheral side portions, i.e. circular arc protuberant surfaces, of the rod core 1 and the branch member longitudinal portion 182. The contact between these recessed and protuberant circular arc surfaces substantially eliminates the transmission loss at the branch junction.

The three members 1, 19 and 182 as jointed together as shown in FIG. 8 are fastened together with a transparent tape 171 to provide a branch junction 17.

At the branch junction 17, a portion of the light transmitted through the quartz rod core 1 is dividedly led into the branch member longitudinal portion 182 through the joint member 19.

When the light is thus divided and further transmitted, substantially no transmission loss occurs at the protuberant and recessed circular arc surfaces in contact, but slight losses occur at the lower end face of the joint member 19. The transmission loss at the lower end face of the joint member 19 can be reduced to as small as up to 5% of the divided quantity of light to be led to the branch line by minimizing the cross sectional area of the member 19 as seen in FIG. 8. The length of the joint member 19 is preferably about 1 to about 5 cm.

The quantity of light to be separated off at the branch junction 17 is dependent on the contact area between the surfaces of the joint member 19 defining the attaching grooves 191 and the peripheral side surfaces of the rod core 1 and the branch member longitudinal portion 182 attached to the joint member 19. For example, when the joint member 19 has a length of 1 to 5 cm, up to 30% of the light through the main line can be separated off for transmission toward the branch line.

Light can be transmitted in a variable quantity when the contact area at the branch junction 17 is made variable.

Figure 9:
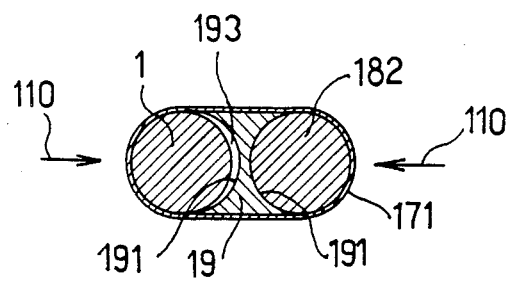
FIG. 9 and FIG. 10 are sectional views showing modifications in the cross sectional form of the joint member.

As shown in FIG. 9, for example, the radius of curvature of the attaching groove 191 of the joint member 19 for the rod core 1 (or longitudinal portion 182 of the member 18) is made slightly smaller than the radius of curvature of the peripheral side portion of the rod core 1, and the rod core 1 is attached to the joint member 19 with a crescent clearance 193 formed therebetween. It is then possible to vary the area of contact between the rod core 1 and the surface of the joint member defining the attaching groove 191 and therefore to vary the quantity of divided light, by suitably adjusting the pressure exerted on the core rod in the direction of arrow 110 shown.

Figure 10:
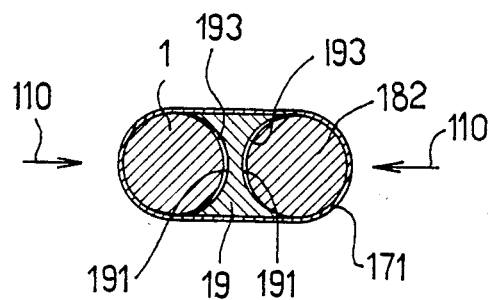

As seen in FIG. 10, the crescent clearance 193 may be formed in each of the attaching grooves 191, 191 of the joint member 19. The same object can be fulfilled also when the radius of curvature of the attaching groove 191 is made slightly larger than that of the peripheral side portion of the rod core 1 or the branch member longitudinal portion 182.

The tape 171 for fastening the branch members is not limited particularly insofar as it is transparent and resistant to light. However, for the reason already given, a tape made of FEP is best suited. A fluoroelastomer tape is also usable. The joint member 19 and the tape 171 can be prepared, for example, from vinylidene fluoride-hexafluoropropylene copolymer, vinylidene fluoride-hexafluoropropylene tetrafluoroethylene copolymer, etc. FIG. 7 further shows the quartz rod core 1' of a branch transmission line which is connected to the horizontal portion 182' for the branch member 18. A silicone rubber layer 41 and FEP tube 42 are usable for the connection as in the first type of the invention.

Like the branch junction of the first type, the branch junction 17 can be protected with an FEP material and metal tube (divided one).

According to the second type of the present invention, the branch member 18 can be easily removed from the quartz rod core 1 by removing the tape 171. Accordingly, an illuminating device connected to the branch transmission line can be turned off by removing the branch member 18, or can be turned on by attaching the branch member to the rod core. Thus, the branch junction 17 can be made to have the same function as a switch in electric wiring by rendering the branch member 18 removably connectable.

We claim:

1. A branch structure for a rod-type optical transmission line having a quartz rod core, characterized in that a substantially L-shaped quartz rod branch member is connected at a longitudinal portion thereof to a peripheral side portion of the quartz rod core of the transmission line at a straight portion thereof by a transparent elastic joint member, the longitudinal portion of the branch member extends from the rod core with longitudinal axes of the rod core and of the longitudinal portion in parallel and with an axis of a horizontal portion of the branch member traverse to the axis of the rod core, the joint member having opposite side portions provided with attaching grooves having a circular arc cross section and which attaching grooves are fitable to the peripheral side portions of the quartz rod core and the quartz rod branch member, at least one of the attaching grooves having a radius of curvature in the side portions of the joint member slightly different from the radius of curvature of the respective peripheral side portion of the rod core and rod branch member to be fitted in the groove.

2. A branch structure as defined in claim 1 wherein the joint member is made of silicon rubber.

3. A branch structure as defined in claim 1 wherein the joint member is made of fluoroelastomer.

4. A branch structure as defined in claim 1 wherein the opposite side surfaces of the joint member are entirely recessed inward to define the circular arc attaching grooves.

5. A branch structure as defined in claim 1 wherein the radius of curvature of said groove is slightly larger than the radius of curvature of the peripheral side portion.

6. A branch structure as defined in claim 1 wherein the radius of curvature of said groove is slightly smaller than the radius of curvature of the peripheral side portion.

7. A branch structure as defined in claim 1 wherein the branch member has a length in the range of 1 to 5 cm.

8. A branch structure as defined in claim 1 wherein the quartz rod core, the joint member and the branch member longitudinal portion are joined together and further fastened by a tape.

9. A branch structure as defined in claim 8 wherein the tape is made of FEP.

10. A branch structure as defined in claim 8 wherein the tape is made of fluoroelastomer.

* * * * *